(12) United States Patent
Franklin

(10) Patent No.: US 10,909,359 B2
(45) Date of Patent: Feb. 2, 2021

(54) APPLICATION FOR USE WITH BUSINESS CARDS

(71) Applicant: Jacqueline Marie Franklin, Loganville, GA (US)

(72) Inventor: Jacqueline Marie Franklin, Loganville, GA (US)

( * ) Notice: Subject to any disclaimer, the term of this patent is extended or adjusted under 35 U.S.C. 154(b) by 344 days.

(21) Appl. No.: 15/990,892

(22) Filed: May 29, 2018

(65) Prior Publication Data

US 2019/0370538 A1 Dec. 5, 2019

(51) Int. Cl.
| G06K 9/00 | (2006.01) |
| H04M 1/2755 | (2006.01) |
| H04W 4/18 | (2009.01) |
| G06Q 50/00 | (2012.01) |

(52) U.S. Cl.
CPC ......... *G06K 9/00456* (2013.01); *G06Q 50/01* (2013.01); *H04M 1/2755* (2013.01); *H04W 4/185* (2013.01)

(58) Field of Classification Search
CPC ... G06K 9/00456; G06Q 50/01; H04W 4/185; H04W 4/21; H04M 1/2755; H04M 1/2757
See application file for complete search history.

(56) References Cited

U.S. PATENT DOCUMENTS

| 7,702,128 B2* | 4/2010 | Cohen | H04N 1/00347 |
| | | | 382/100 |
| 8,744,196 B2* | 6/2014 | Sharma | G06K 9/46 |
| | | | 382/224 |
| 2006/0221409 A1* | 10/2006 | Cohen | H04N 1/00204 |
| | | | 358/462 |
| 2011/0170788 A1* | 7/2011 | Nepomniachtchi | G06K 9/726 |
| | | | 382/229 |
| 2011/0270617 A1* | 11/2011 | Pacheco E Murta | G06Q 30/02 |
| | | | 705/1.1 |
| 2013/0311892 A1* | 11/2013 | Hsieh | G06Q 10/10 |
| | | | 715/738 |
| 2014/0365395 A1* | 12/2014 | Arguelles | G06Q 10/10 |
| | | | 705/342 |
| 2015/0281402 A1* | 10/2015 | Coffing | H04L 67/306 |
| | | | 709/203 |
| 2015/0324640 A1* | 11/2015 | Macciola | G06K 9/18 |
| | | | 382/112 |
| 2016/0267488 A1* | 9/2016 | Vadura | G06Q 50/01 |
| 2016/0314164 A1* | 10/2016 | Niu | H04M 3/42042 |
| 2016/0371736 A1* | 12/2016 | Turner | H04W 4/80 |
| 2017/0244795 A1* | 8/2017 | Coffing | G06F 16/955 |
| 2017/0278068 A1* | 9/2017 | Xing | G06F 3/0488 |
| 2017/0279314 A1* | 9/2017 | Ding | H02J 50/80 |
| 2018/0270307 A1* | 9/2018 | Yamada | G06F 16/2379 |

(Continued)

*Primary Examiner* — Bobbak Safaipour
(74) *Attorney, Agent, or Firm* — Tod A. Kupstas

(57) ABSTRACT

An application for a mobile device, such as a phone, is able to process business card data. A business card can be registered to the application and stored within the application. The individual who registers the information receives identification information, such as simple numerical or verbal sequence, that is able to then be shared with another person who can download the application and enter the identification information into the application. Entering in the identification information will download a person's data from the person's business.

15 Claims, 2 Drawing Sheets

(56) References Cited

U.S. PATENT DOCUMENTS

2018/0330158 A1* 11/2018 Gupta ................... G06F 16/51
2019/0278986 A1* 9/2019 Nepomniachtchi ...... G06K 9/42
2020/0065423 A1* 2/2020 Lin ....................... G06F 16/955

* cited by examiner

APPLICATION FOR USE WITH BUSINESS CARDS

BACKGROUND

1. Field

This application is directed to the field of mobile applications, in particular the application is related to business related mobile applications.

2. Description of the Related Art

Typically, during a business engagement or a networking event individuals share information with each other. One way in which people share information with each other is through the use of business cards.

While business cards can provide information about people and their businesses, frequently the cards are misplaced or discovered tucked away at the bottom of a bag weeks or months later. Discovering business cards months in the future can sometimes spark a memory of when and where it was procured, but often the card is simply tossed aside, the information never to be recalled or used.

Therefore, there is a need in the field to provide a way in which business card information can be exchanged without suffering from the drawbacks of being misplaced, forgotten or destroyed.

SUMMARY

Briefly described, aspects of the present disclosure relate to an application, for use with mobile devices, that is able to process and share business card data.

An aspect of the present disclosure is a method for exchanging business cards using a mobile device. The method comprises capturing data from a business card with an application stored on the mobile device; transferring the data to a cloud based service using the mobile device; associating the data with identification information; transferring the identification information to the mobile device; providing the identification information to another mobile device; entering the identification information into the another mobile device; retrieving the data from the business card from the cloud based service; and downloading the data from the business card to the another mobile storage device.

Another aspect of the present disclosure is an application stored on a mobile device. The application has non-transient executable software code adapted to capture data from a business card; transfer the data from the business card to a cloud storage service using the mobile device; associate the data with identification information; transfer the identification information to the mobile device; provide the identification information to another mobile device; enter the identification information into the another mobile device; retrieve the data from the business card from the cloud storage service; and download the data from the business card to the another mobile storage device.

Yet another aspect of the present disclose is a mobile device. The mobile device has a processor; a camera operably connected to the processor, wherein the camera is adapted to take images of business cards; a wireless connectivity component operably connected to the processor, wherein the wireless connectivity component is adapted to transfer data to and from the mobile device to a cloud storage service; and wherein the processor is adapted to process images of business cards, retrieve identification information associated with at least one of the images of the business cards, and use identification information to retrieve business card data from the cloud storage service.

DETAILED DESCRIPTION

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art familiar with this disclosure.

The components described hereinafter as making up the various embodiments are intended to be illustrative and not restrictive. Many suitable components that would perform the same or a similar function as the components described herein are intended to be embraced within the scope of embodiments of the present disclosure.

Now turning to the features of the present application, those features will now be discussed in detail.

While attending a networking event, a conference or just meeting someone during a business related situation, frequently business cards are exchanged. A problem with physical business cards is that they are frequently lost, misplaced and often missing when needed.

The present disclosure is directed towards an application that is able to incorporate the information from a business card and make it readily accessible via a mobile device, a computer or other electronic platform that can maintain and make the information readily accessible.

Figure 1:
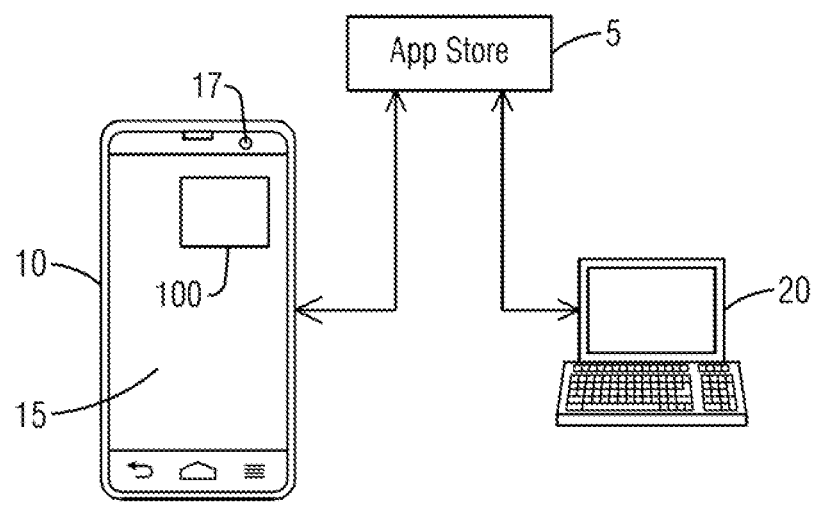
FIG. 1 is a diagram of a system for downloading the application.

Referring now to FIG. 1, the application 100 operates by being able to store business card data in a readily accessible location. The application 100 itself is readily accessible and available to users of mobile devices. For example, the application 100 can be made available in an app store 5 such as Apple iTunes or the Android app store. A user can access and download the application 100 to their mobile device 10 or a computer 20 from the app store 5.

The mobile device 10 may be any mobile phone, tablet device, wearable (such as a watch) or other readily transportable device. The computer 20 may be any laptop or tablet/laptop device. Additionally, the computer 20 may be a desktop device or other typically non-mobile computer device. When discussing the invention below, the mobile device 10 will be discussed. However it should be understood that where appropriate, a computer 20 may be used in the place of the mobile device 10.

Still referring to FIG. 1, once the user downloads the application 100, it appears on the screen 15 of the mobile device 10. The application 100 may have available an option to access the camera 17 of the mobile device 10. The application 100 may also be able to access other programs and information from the mobile device 10. For example, the contacts stored on the mobile device 10 may also be accessed by the application 100.

Figure 2:
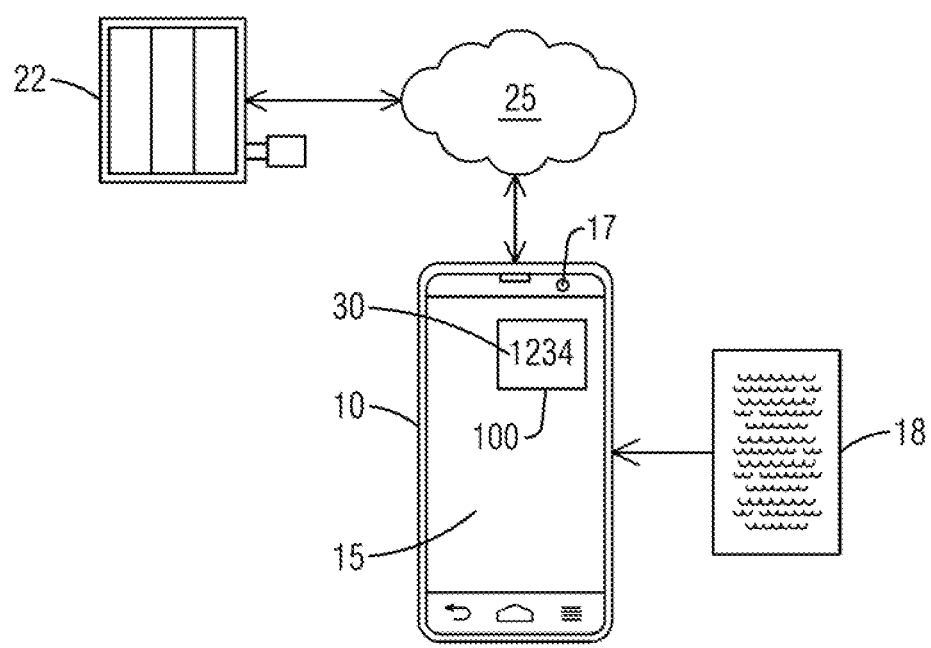
FIG. 2 is another diagram of the system.

Now turning to FIG. 2, when the camera 17 is accessed a user may take the mobile device 10 and capture an image of a business card 18. Business card 18 may be any type of physical medium that contains thereon data related to a business or other activity with which an individual is involved. While the business card 18 is referred to as a "business" card it is intended to capture hobbies, sports activities, charitable events, etc. The business card 18 may be any type of medium that a reasonable person would consider a business card regardless of the information that is contained thereon. Furthermore, while reference is made to a card, it should be understood that other tokens, gadgets or promotional items may also be encompassed by the scope of this disclosure. For example, a promotional t-shirt or pen may also be utilized by the application 100 in order to provide business data.

The application 100 may use the camera 17 to capture an image of a business card 18 and then analyze the image to capture the salient data. The image may be scanned using optimized character recognition (OCR) or some other text recognizing software. The text recognition software may take the text it recognizes and associate it with the related data category. For example, text data typically associated with an address may be allocated and stored to a corresponding address related field within the application 100.

The application can use a plurality of scanned business cards 18 and apply machine learning in order intelligently create a database 22 that accurately stores the relevant data in the proper category. In this manner, by constantly refining the storage and allocation of the relevant data, social trends and technological changes can be accounted for and adapted to. For example, by maintaining a constant machine learning database 22 of the business card information, the inclusion of things like twitter handles and facebook pages addresses can be recognized and properly allocated over time. Additionally, changes in fonts, styles, random flourishes or other trends can be picked up on overtime and accounted for in the storage within the database 22.

Once the data is captured from the business card 18 it is stored in a database 22 that can reside in a cloud based service 25. The database 22 may be any digital storage medium and/or non-digital storage medium that is accessible by a computer 20 or mobile device 10. A cloud based service 25 generally refers to distributed networks of computers and devices that store digital information in a location that can be located non-locally and is readily accessible over the internet or otherwise wirelessly. For example, the cloud based service 25 may be a plurality of databases 22 located at a central location that is readily accessible via the internet. Alternatively, the cloud based service 25 may be a distributed network of databases 22, etc.

Once the data is transferred to and stored in the cloud based service 25 it is then available to access at a later point in time. Once the data is transferred and stored, the data stored may be verified by the user in order to validate that each piece of data is stored in the right data field. When the data is verified (or without verification-if not requested) identification information 30 can be sent to the user.

Still referring to FIG. 2, the identification information 30 may be a numerical code, such as 1234, 65893, etc. The numerical code can also be further refined to accommodate one individual or account having multiple business cards 18 that have been captured. In that situation the identification information 30 may have a common root number and then a changing alphanumerical character. So for example, 1234-A, 1234-B, etc. Additionally, in an embodiment, the identification information 30 is a short phrase or combination of words. Such as for example, touchlessideas, infinitesky, etc. The phrase may be associated with the business, chosen by the user, or otherwise randomly generated. Duplication of phrases can be restricted by the system in order to prevent users from attempting to use the same phrase.

Figure 3:
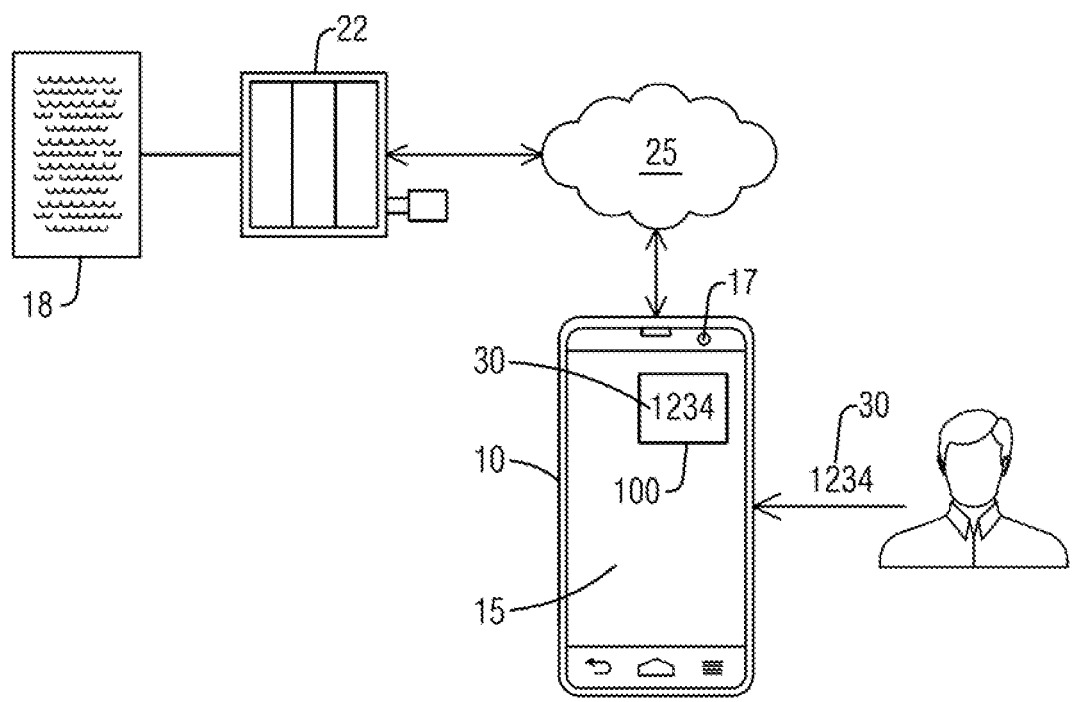
FIG. 3 is another diagram of the system.

Now turning to FIG. 3, in use a person who has registered their business card 18 in the application 100 can then make use of the application 100 by conveying their identification information 30 to another user. The other user can then enter the identification information 30 into the application 100. If the other user does not already have the application 100, the user may first download the application 100 from a app store 5.

The application 100 will then access the cloud based service 25 and retrieves the data that had been originally captured from the business card 18. In addition to the original data, other information may be downloaded and associated with the accessing of the data from the cloud based service 25. In an embodiment, geo-location data may be associated with the data at the time of downloading the data. In this way the location (and time) may be associated with the data from the business card 18. This can alleviate situations where it may be difficult to place the time and location in which a business card 18 was acquired.

Additionally, web-site information and other information related to the business may be downloaded, such as current specials, discounts, associated businesses, etc. For example, a presenter at a conference can include the identification information 30 in a slide during a presentation. Those members of the audience that are interested can obtain the contact information by entering the identification information 30 in the application 100. Business associated data can be downloaded from the cloud based service 25 to the mobile device 10. The data can be stored in contacts and within the application 100. Additionally, associated coupons, websites, etc. can also be downloaded and stored in their associated locations. Furthermore, additional contacts for associated businesses may also be downloaded at the same time.

In an embodiment, a user can download identification information 30 and receive the contact information for everyone presenting at conference and their associated businesses. In an embodiment, when registering at a conference or tradeshow, identification information 30 can be entered and the contact information for everyone attending the conference can be downloaded at the same time. Alternatively, identification information 30 can be broken down into sub-groups or regions in order to better serve a particular user.

In an embodiment, a user can have multiple sets of identification information 30 that can provide different levels of access to data. Alternatively, the same level of data may be provided but depending on the identification information 30 that is provided to a user can help determine whether or not the individual received your information from a conference or met a user individually.

In an embodiment, the downloaded data can automatically be transferred to contacts, an excel spreadsheet or other application that is stored locally or offsite that assists in organizing data.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for exchanging business cards using a mobile device comprising:

capturing data from a business card with an application stored on the mobile device;

transferring the data from the business card to a cloud based service using the mobile device;

associating the data with identification information, wherein the identification information is selected from a group consisting of numbers, letter, words, or combinations thereof;

transferring the identification information to the mobile device;

providing the identification information to another mobile device;

entering the identification information into the another mobile device;

retrieving the data from the business card from the cloud based service associated with the identification information; and downloading the data from the business card to the another mobile storage device.

2. The method of claim 1, further comprising generating geo-location data during the step of retrieving the data from the business card from the cloud storage service.

3. The method of claim 1, further comprising applying a machine learning algorithm to the data, wherein the machine learning algorithm is adapted to identify information relevant for identification of a business or user.

4. The method of claim 1, further comprising retrieving a website address at the same time as the data from the business card.

5. The method of claim 1, wherein the step of capturing data from a business card with an application stored on a mobile device is accomplished using a camera.

6. The method of claim 5, wherein the captured data using the camera is processed using OCR processing.

7. An application stored on a mobile device comprising:
non-transient executable software code that is adapted to:
capture data from a first business card;
transfer the data from the first business card to a cloud storage service using the mobile device;
associate the data with first identification information, wherein the identification information is selected from a group consisting of numbers, letter, words, or combinations thereof;
transfer the first identification information to the mobile device;
provide the first identification information to another mobile device;
enter second identification information from another mobile device; and
retrieve a second business card from the cloud storage service using the second identification information.

8. The application of claim 7, wherein the code is further adapted to generate geo-location data.

9. The application of claim 7, wherein a machine learning algorithm is applied to the data, wherein the machine learning algorithm is adapted to identify information relevant for identification of a business or user.

10. The application of claim 7, further comprising wherein the code is adapted to retrieve a website address at the same time as the data from the business card.

11. The application of claim 7, wherein the code is adapted to capture data from a business card with a camera.

12. The application of claim 11, wherein the captured data using the camera is processed using OCR processing.

13. A mobile device comprising:
a processor;
a camera operably connected to the processor, wherein the camera is adapted to take images of business cards;
a wireless connectivity component operably connected to the processor, wherein the wireless connectivity component is adapted to transfer data to and from the mobile device to a cloud storage service; and
wherein the processor is adapted to process images of business cards, retrieve identification information associated with at least one of the images of the business cards, and use identification information to retrieve business card data from the cloud storage service, wherein the identification information is selected from a group consisting of numbers, letter, words, or combinations thereof.

14. The mobile device of claim 13, further comprising a geo-location device for associating geo-location data with the identification information.

15. The mobile device of claim 13, further comprising a machine learning algorithm applied to the data, wherein the machine learning algorithm is adapted to identify information relevant for identification of a business or user.

* * * * *